United States Patent
Li

(10) Patent No.: US 11,658,435 B2
(45) Date of Patent: May 23, 2023

(54) ELECTRICAL CONNECTOR FOR CHARGING

(71) Applicant: T-CONN PRECISION CORPORATION, New Taipei (TW)

(72) Inventor: Ju-Ping Li, New Taipei (TW)

(73) Assignee: T-CONN PRECISION CORPORATION, New Taipei (TW)

( * ) Notice: Subject to any disclaimer, the term of this patent is extended or adjusted under 35 U.S.C. 154(b) by 78 days.

(21) Appl. No.: 17/516,058

(22) Filed: Nov. 1, 2021

(65) Prior Publication Data

US 2023/0069807 A1 Mar. 2, 2023

(30) Foreign Application Priority Data

Aug. 27, 2021 (TW) ................................ 110131791

(51) Int. Cl.
*H01R 24/52* (2011.01)
*H01R 13/24* (2006.01)
*H01R 24/38* (2011.01)
*H01R 103/00* (2006.01)

(52) U.S. Cl.
CPC ......... *H01R 13/2421* (2013.01); *H01R 24/38* (2013.01); *H01R 2103/00* (2013.01)

(58) Field of Classification Search
CPC ...... H01R 13/2421; H01R 24/38; H01E 24/40
See application file for complete search history.

(56) References Cited

U.S. PATENT DOCUMENTS

| 2,757,351 | A | * | 7/1956 | Klostermann | H01R 13/22 439/700 |
| 4,674,809 | A | * | 6/1987 | Hollyday | H01R 13/7197 439/620.09 |
| 6,296,519 | B1 | * | 10/2001 | Hashizawa | H01R 13/6599 439/607.42 |
| 6,302,739 | B1 | * | 10/2001 | Deno | H01R 13/6582 439/607.17 |
| 6,796,838 | B2 | * | 9/2004 | Yoshioka | H01R 13/748 439/607.41 |

(Continued)

FOREIGN PATENT DOCUMENTS

CN 209133812 U 7/2019
TW I700869 B 8/2020

(Continued)

*Primary Examiner* — Neil Abrams
(74) *Attorney, Agent, or Firm* — Rabin & Berdo, P.C.

(57) ABSTRACT

An electrical connector for charging has a connector base, a first conductive terminal, a second conductive terminal, and an insulation base. The first conductive terminal is mounted in the connector base and has an upper chamber and a lower chamber. The second conductive terminal is located in and coaxial with the first conductive terminal and is electrically isolated from the first conductive terminal. The insulation base is mounted between the first and the second conductive terminals. An end of the second conductive terminal is located in the upper chamber and another end protrudes out of a bottom of the insulation base. The insulation base has at least one first groove lower than an imaginary datum plan and at least one platform higher than the imaginary datum plane and coaxial with the first groove. By the first groove and the platform, the creepage distance is increased.

18 Claims, 12 Drawing Sheets

(56) References Cited

U.S. PATENT DOCUMENTS

| | | | | |
|---|---|---|---|---|
| 7,044,781 | B2* | 5/2006 | Goto | A61F 15/006 |
| | | | | 439/926 |
| 7,131,866 | B2* | 11/2006 | Zuch | H01R 13/2421 |
| | | | | 439/700 |
| 7,311,566 | B2* | 12/2007 | Dent | H01R 13/53 |
| | | | | 439/63 |
| 7,465,190 | B2* | 12/2008 | Henningsen | H01R 24/40 |
| | | | | 439/578 |
| 8,052,472 | B2* | 11/2011 | Uchida | H01R 13/6591 |
| | | | | 439/108 |
| 9,601,864 | B2* | 3/2017 | Schmidt | H01R 13/5202 |
| 11,046,198 | B2* | 6/2021 | McColl | H01R 13/6205 |
| 2023/0054340 | A1* | 2/2023 | Zheng | H01R 4/60 |
| 2023/0069807 | A1* | 3/2023 | Li | H01R 13/2421 |
| 2023/0071830 | A1* | 3/2023 | Li | H01R 13/10 |

FOREIGN PATENT DOCUMENTS

| | | |
|---|---|---|
| TW | I701869 B | 8/2020 |
| TW | M604976 U | 12/2020 |

* cited by examiner

ELECTRICAL CONNECTOR FOR CHARGING

BACKGROUND OF THE INVENTION

1. Field of the Invention

The present invention relates to an electrical connector, especially to an electrical connector for charging that has an undulating structure formed on an insulation base of the electrical connector and being higher or lower than an imaginary datum plane to increase creepage distance.

2. Description of the Prior Arts

In recent years, urged by issues of environmental protection and alternative energy, electric vehicles have become one of the hottest industries. Electric vehicles must rely on charging to maintain durability. For example, an electric motorcycle must replace batteries for renewing durability and continuing driving, and a battery is detachably and electrically connected to the electric motorcycle via an electrical connector. Since the electrical connector is used as a power transmission interface, the electrical connector has to comply with specific standards and regulations on electrical specifications.

According to the China national standard GB 24155-2020 "Safety Requirements for Electric Motorcycles and Electric Mopeds", a creepage distance and an electrical clearance of a charging interface are clearly regulated, wherein the creepage distance of a battery should meet the following requirements:

1. A creepage distanced d1 between the connecting terminals of the battery is calculated by function (1) below, in units of mm:

$$d1 \geq 0.25U + 5 \tag{1}$$

2. A creepage distanced d2 between the live parts and the electric platform is calculated by function (2) below, in units of mm:

$$d2 \geq 0.125U + 5 \tag{2}$$

The Algebra "U" in functions (1) and (2) is the maximum working voltage between two output terminals of the battery.

The electrical clearance between the live parts should be longer than 2.5 mm.

With reference to FIG. 7, the ways to measure electrical clearance and creepage distance are shown in FIG. 7. A carrier 70 has two connecting terminals 71, 72. The two connecting terminals 71, 72 respectively have two conductive surfaces 710, 720. A distance between the two conductive surfaces 710 is defined as an electric clearance G. A path along a surface of the carrier 70 between the two connecting terminals 71, 72 is defined as a creepage distance D.

According to the above, the electric clearance and the creepage distance in a charging interface for electric vehicles are regulated in China. With reference to FIGS. 8 and 9, a conventional electrical connector for charging is shown. The conventional electrical connector has a connector base 80, a negative electrode conductive terminal 81, and a positive electrode conductive terminal 82. The negative electrode conductive terminal 81 is mounted in the connector base 80. The positive electrode conductive terminal 82 is coaxially mounted in the negative electrode conductive terminal 81 and is electrically isolated from the negative electrode conductive terminal 81. The negative electrode conductive terminal 81 is a hollow cylinder and has an upper chamber 811 and a lower chamber 812 inside. The upper chamber 811 and the lower chamber 812 communicate with each other. An inner diameter of the upper chamber 811 is larger than an inner diameter of the lower chamber 812. A crown spring 813 is mounted in the upper chamber 811, is electrically connected to the negative electrode conductive terminal 81, and has multiple contacting elastic pieces. Each of the contacting elastic pieces extends along an axial direction and protrudes along a radial direction to form a contact point. When the electrical connector is connected to a corresponding connector, the crown spring 813 is the main conduction medium of the negative terminal, and the contact points are used as a conductive surface of the negative electrode conductive terminal 81.

In order to coaxially mount the positive electrode conductive terminal 82 in the negative electrode conductive terminal 81 and electrically isolate the positive electrode conductive terminal 82 from the negative electrode conductive terminal 81, a shape-complementary insulation base 83 is mounted in the lower chamber 812 and the positive electrode conductive terminal 82 is mounted at a center of the insulation base 83. The insulation base 83 is configured to offer an isolation surface between the positive electrode conductive terminal 82 and the negative electrode conductive terminal 81 to electrically isolate the positive electrode conductive terminal 82 from the negative electrode conductive terminal 81. According to China National Standards, since the working voltage of the electrical connector is 50.4 V, calculated by the aforementioned function (1), the creepage distance must be larger than or equal to 17.6 mm (0.25×50.4+5), and the electrical clearance must be larger than 2.5 mm.

Applied on the abovementioned conventional electrical connector, the creepage distance, which is defined along the surface of the insulation base 83 from the negative electrode conductive terminal 81 to the positive electrode conductive terminal 82, must be larger than 17.6 mm. The contact point of the crown spring 813 is used as the conductive surface of the negative electrode conductive terminal 81, and the electrical clearance between the contact point and the positive electrode conductive terminal 82 must be larger than 2.5 mm. With reference to FIG. 10, according to the actual measurement result, the electrical clearance G1 from the contact point of the crown spring 813 to the positive electrode conductive terminal 82 is 6.02 mm, which is larger than 2.5 mm and meets the safety requirements. However, the creepage distance $\overline{AB}$ measured along the surface of the insulation base 83 from the negative electrode conductive terminal 81 to the positive electrode conductive terminal 82 is 7.33 mm, which is far below 17.6 mm required by the standard and does not meet the requirements.

Besides, the abovementioned conventional electrical connector also confronts the problem that the creepage distance does not meet the safety requirements in terms of external connections. With reference to FIG. 9, the negative electrode conductive terminal 81 and the positive electrode conductive terminal 82 are respectively connected to two electrically connecting pieces 84, 85. The two electrically connecting pieces 84, 85 each have one respective end connected to the bottom of the negative electrode conductive terminal 81 and the positive electrode conductive terminal 82, and the other ends of the two electrically connecting pieces 84, 85 are curved and extend out of the bottom of the connector base 80. Said ends extending out of the bottom of the connector base 80 are further curved and parallel to the bottom surface of the connector base 80 to form two electrically connecting segments 840, 850, which are used for connecting to external appliances.

With reference to FIGS. 9 and 11, said ends of the two electrically connecting pieces 84, 85 exposed from the connector base 80 are respectively located in two opposite sides of the bottom of the connector base 80. Limited by the structure of the connector base 80, the distance between the two electrically connecting pieces 84, 85 has been maximally increased. Though the distance D1 between the two electrically connecting pieces 84, 85 is 17.15 mm and is much larger than 2.5 mm according to the requirements, the creepage distance is still less than 17.6 mm according to the requirements.

In summary, the conventional electrical connector for charging cannot meet the safety requirements on creepage distance and needs to be improved.

To overcome the shortcomings, the present invention provides an electrical connector for charging to mitigate or obviate the aforementioned problems.

SUMMARY OF THE INVENTION

The main objective of the present invention is to provide an electrical connector for charging that has a special undulating structure formed on the insulation base between the terminals to increase creepage distance and heat dissipation area, thereby meeting the safety requirements.

The electrical connector for charging has a connector base, a first conductive terminal, a second conductive terminal, and an insulation base. The first conductive terminal is mounted in the connector base. An end of the first conductive terminal is mounted in the connector base and another end of the first conductive terminal protrudes out of the connector base. The first conductive terminal is a hollow cylinder and has an upper chamber and a lower chamber. The second conductive terminal is mounted in the connector base, is located in the first conductive terminal, is coaxial with the first conductive terminal, and is electrically isolated from the first conductive terminal. The insulation base is mounted between the first conductive terminal and the second conductive terminal, is mounted in the lower chamber of the first conductive terminal, and is shape-complementary with the lower chamber. The second conductive terminal is mounted at a center of the insulation base. An end of the second conductive terminal is located in the upper chamber of the first conductive terminal and another end of the second conductive terminal protrudes out of a bottom of the insulation base. The insulation base has an imaginary datum plane and an undulating structure. The undulating structure is formed on the imaginary datum plane and has at least one first groove and at least one platform. The at least one first groove is lower than the imaginary datum plane and is ring-shaped. The at least one platform is higher than the imaginary datum plane, is ring-shaped, and is coaxial with the at least one first groove.

The imaginary datum plane of the insulation base of the electrical connector coaxially forms a ring-shaped undulating structure. By the undulating structure protruding from and concaved in the imaginary datum plane, the creepage distance along the surface of the insulation base and from the first conductive terminal to the second conductive terminal is significantly extended and the heat dissipation area is also expanded, thereby fully meeting the safety requirements.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
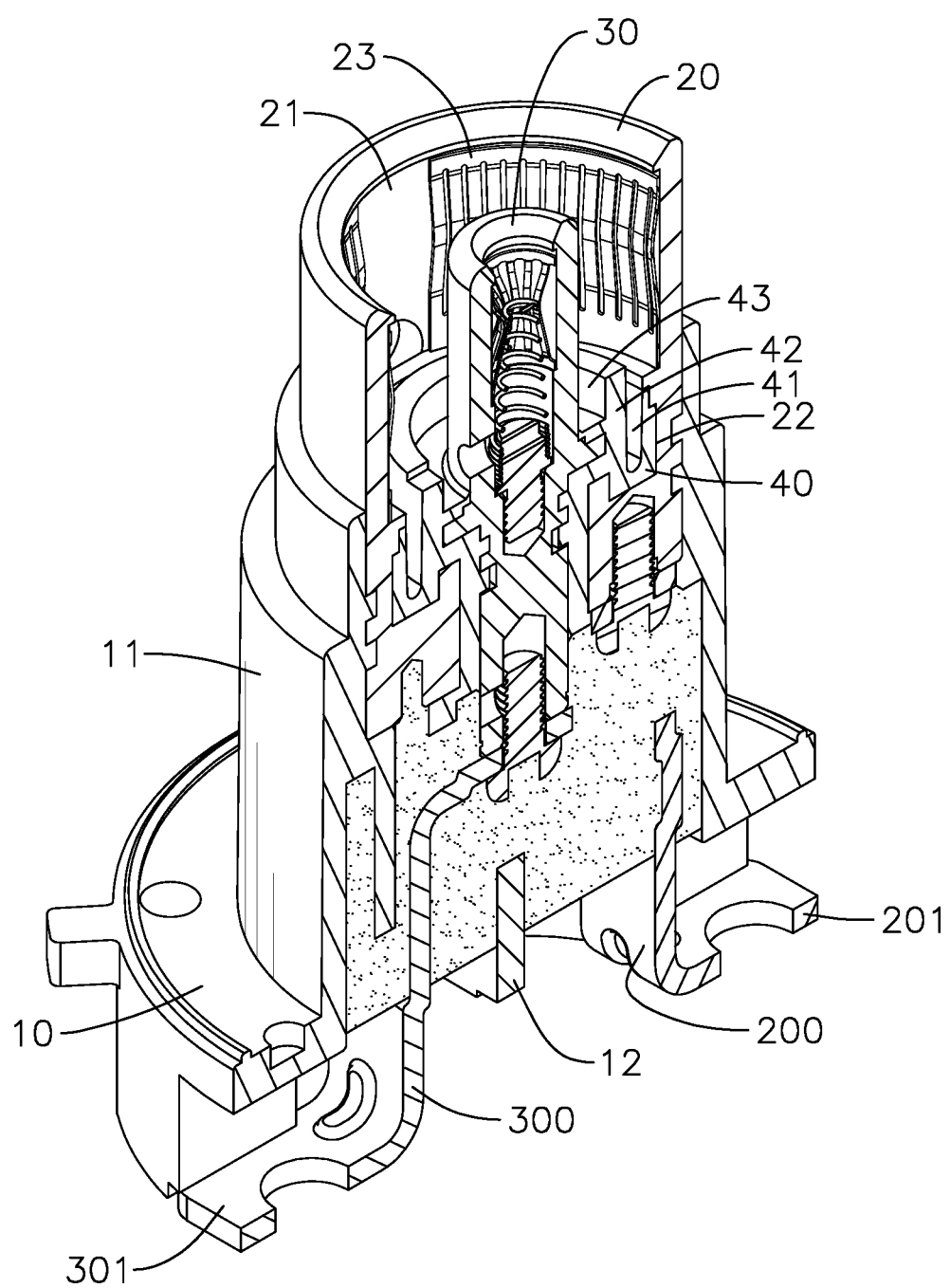
FIG. 1 is a perspective view in cross-section of a preferred embodiment of an electrical connector for charging in accordance with the present invention.
Figure 2:
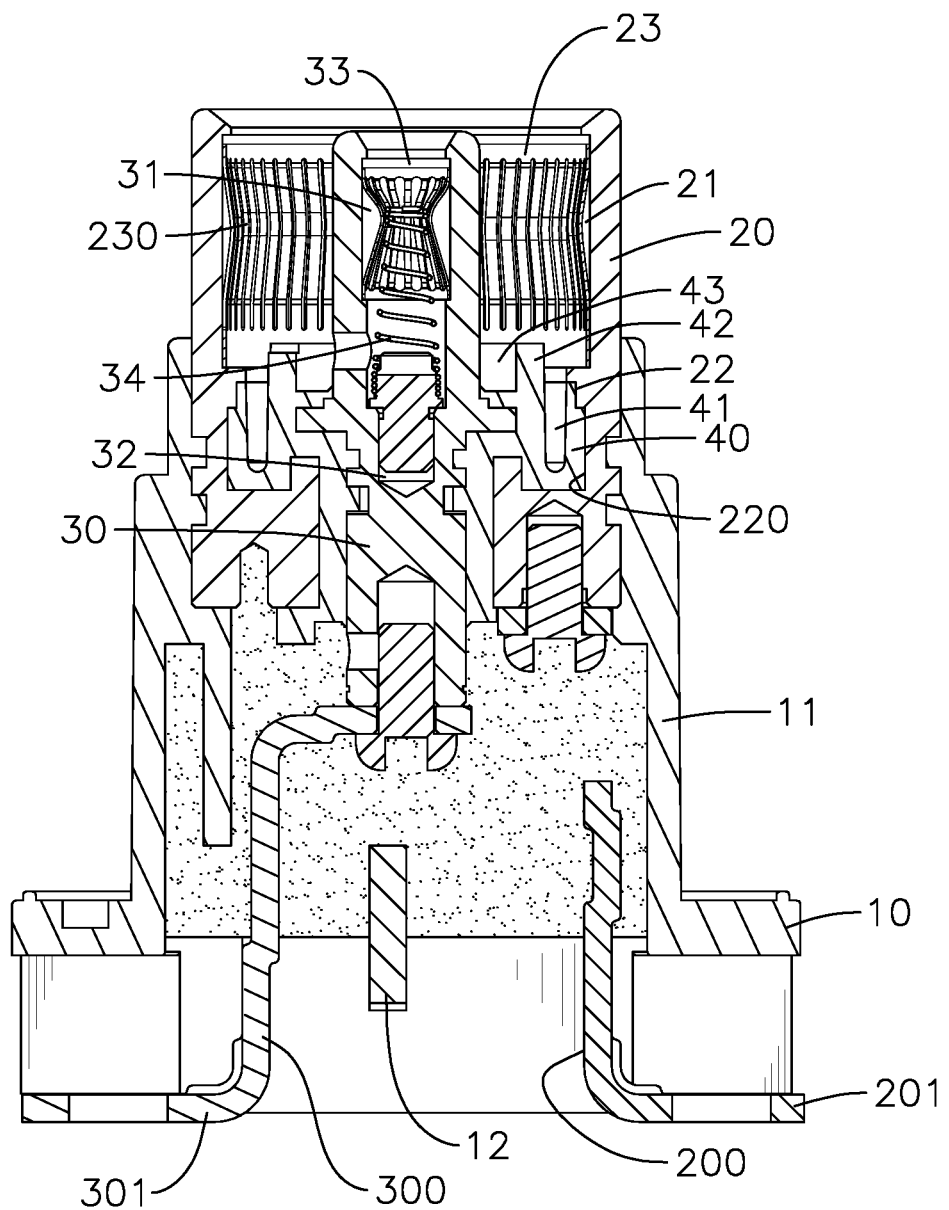
FIG. 2 is a side view in cross-section of the preferred embodiment of the electrical connector for charging in FIG. 1.

With reference to FIGS. 1 and 2, a preferred embodiment of an electrical connector for charging in accordance with the present invention comprises a connector base 10, a first conductive terminal 20, and a second conductive terminal 30. The first conductive terminal 20 is mounted in the connector base 10. The second conductive terminal 30 is mounted in the connector base 10, is located in the first conductive terminal 20, is coaxial with the first conductive terminal 20, and is electrically isolated from the first conductive terminal 20. The first conductive terminal 20 can be set as a negative connection terminal and the second conductive terminal 30 can be set as a positive connection terminal, but the present invention is not limited to this configuration as the first conductive terminal 20 can also be set as a positive connection terminal and the second conductive terminal 30 can also be set as a negative connection terminal according to actual needs.

The connector base 10 is hollow and has a protruding segment 11. The protruding segment 11 is coaxial with the connector base 10 and formed on a round base, extends along an axial direction of the round base, and is an annular wall. The protruding segment 11 is assembled with an end of the first conductive terminal 20 and is shape-complementary with the first conductive terminal 20.

The first conductive terminal 20 is a hollow cylinder. The end of the first conductive terminal 20 is mounted in the protruding segment 11 of the connector base 10 and another end of the first conductive terminal 20 protrudes out of the protruding segment 11 of the connector base 10. The first conductive terminal 20 has an upper chamber 21 and a lower chamber 22 formed inside and communicating to each other. An inner diameter of the upper chamber 21 is larger than an inner diameter of the lower chamber 22. The lower chamber 22 further forms an expansion chamber wall 220. The inner diameter of the lower chamber 22 is increased by the expansion chamber wall 220 expanding outward along a radial direction of the first conductive terminal 20.

An insulation base 40 is mounted in the lower chamber 22 of the first conductive terminal 20 and is shape-complementary with the lower chamber 22. The insulation base 40 is made from insulation materials and has an imaginary datum plane and an undulating structure. The imaginary datum plane is exposed in a bottom of the upper chamber 21. The undulating structure is formed on the imaginary datum plane and has at least one first groove 41 and at least one platform 42. The at least one first groove 41 is lower than the imaginary datum plane and is ring-shaped. The platform 42 is higher than the imaginary datum plane, is ring-shaped, and is coaxial with the first groove 41.

In this embodiment, the first groove 41 is located on an outer side of the platform 42. In other words, an inner diameter of the first groove 41 is larger than or equal to an outer diameter of the platform 42. The first groove 41 is relatively close to the first conductive terminal 20 while the platform 42 is relatively close to the second conductive terminal 30. Additionally, the depth of the first groove 41 of the undulating structure is larger than a half of a thickness of the insulation base 40. Specifically, under the premise the structural strength and specification requirements, the depth of the first groove 41 should be maximally increased. The platform 42 protrudes from the imaginary datum plane and is higher than the bottom of the upper chamber 21 of the conductive terminal 20. In this embodiment, the outer diameter of the platform 42 of the undulating structure is equal to the inner diameter of the first groove 41, and an outer annular wall of the platform 42 is formed by an inner side wall of the first groove 41 extending upward.

According to the above, the preferred embodiment of the present invention is to form a coaxial undulating structure on the imaginary datum plane of the insulation base 40 between the first conductive terminal 20 and the second conductive terminal 30. The undulating structure has a first groove 41 and a platform 42. The first groove 41 and the platform 42 make the surface of the insulation base 40 undulating. Therefore, a surface area of an insolation surface of the insulation base 40 between the first conductive terminal 20 and the second conductive terminal 30 can be significantly increased, and the creepage distance between the first conductive terminal 20 and the second conductive terminal 30 can be extended to meet the requirements of specifications.

Figure 3:
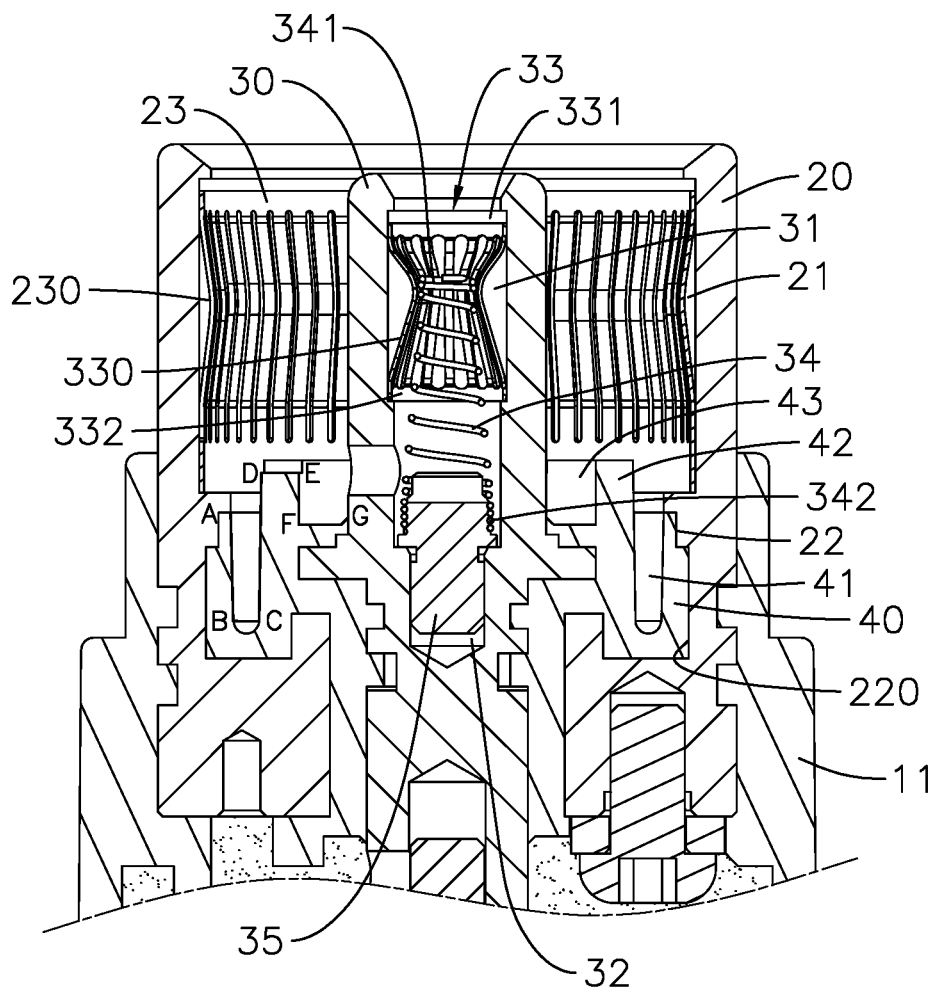
FIG. 3 is a partial enlarged side view in cross-section of the preferred embodiment of the electrical connector for charging in FIG. 1.
Figure 4:
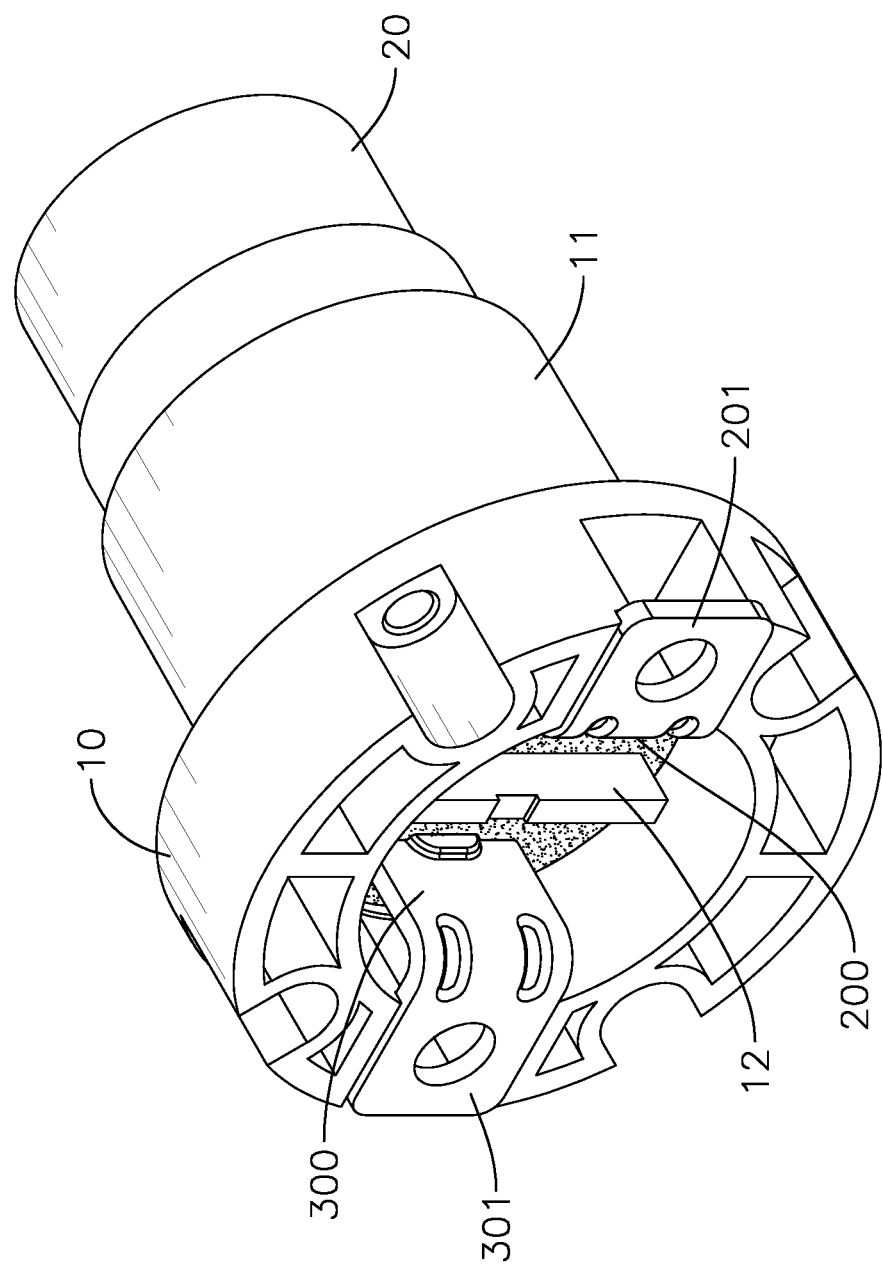
FIG. 4 is a perspective view from the bottom of the preferred embodiment of the electrical connector for charging in FIG. 1.

Moreover, the inner diameter of the lower chamber 22 of the first conductive terminal 20 in the present invention is expanded by forming the expansion chamber wall 220, and thus the outer diameter of the insulation base 40 is also increased, so the creepage distance in a horizontal direction between the first conductive terminal 20 and the second conductive terminal 30 is increased, which means the undulating structure of the insulation base 40 is allowed to formed more first grooves 41 and more platforms 42. With reference to FIG. 3, the undulating structure of the insulation base 40 further has a second groove 43. The second groove 43 is located on an inner side of the platform 42. The second groove 43 is lower than the imaginary datum plane but is higher than the first groove 41. Therefore, a creepage distance along the surface of the insulation base 40 from the first conductive terminal 20 to the second conductive terminal 30 is $\overline{AB}+\overline{BC}+\overline{CD}+\overline{DE}+\overline{EF}+\overline{FG}$, which reaches 18.06 mm via measurement and meets the safety requirements of more than 17.6 mm.

A crown spring 23 is electrically mounted in the upper chamber 21 of the first conductive terminal 20 and has multiple contacting elastic pieces. Each of the contacting elastic pieces protrudes along a radial direction of the first conductive terminal 20 to form a contact point 230. The electrical clearance between the first conductive terminal 20 and the second conductive terminal 30 is the distance between the contact point 230 of the crown spring 23 and the second conductive terminal 30, which is always larger than 2.5 mm according to the safety requirement specifications.

With reference to FIGS. 1 and 2, a first conductive piece 200 and a second conductive piece 300 are mounted on a bottom of the connector base 10. An end of the first conductive piece 200 is fixed on a bottom of the first conductive terminal 20 and is electrically connected to the first conductive terminal 20. Another end of the first conductive piece 200 extends out of the bottom of the connector base 10, is turned perpendicularly toward a side of the bottom of the connector base 10, and extends horizontally to form a first electrically connecting segment 201. An end of the second conductive piece 300 is fixed on a bottom of the second conductive terminal 30 and is electrically connected to the second conductive terminal 30. Another end of the second conductive piece 300 extends out of the bottom of the connector base 10, is turned perpendicularly toward a side opposite to the first conductive piece 200 of the bottom of the connector base 10, and extends horizontally to form a second electrically connecting segment 301. The first conductive piece 200 and the second conductive piece 300 are respectively located on two opposite sides of the bottom of the connector base 10, which are the two ends on the diameter of the connector base 10. In order to ensure a creepage distance along a bottom surface of the connector base 10 between the first conductive piece 200 and the second conductive piece 300 meets the safety requirements, a partition wall 12 is mounted on the bottom of the connector base 10, protrudes from the bottom surface of the connector base 10, and is located between the first conductive piece 200 and the second conductive piece 300 to separate the first conductive piece 200 and the second conductive piece 300. Specifically, a width of the partition wall 12 is larger than a width of the first conductive piece 200 and a width of the second conductive piece 300.

Figure 5:
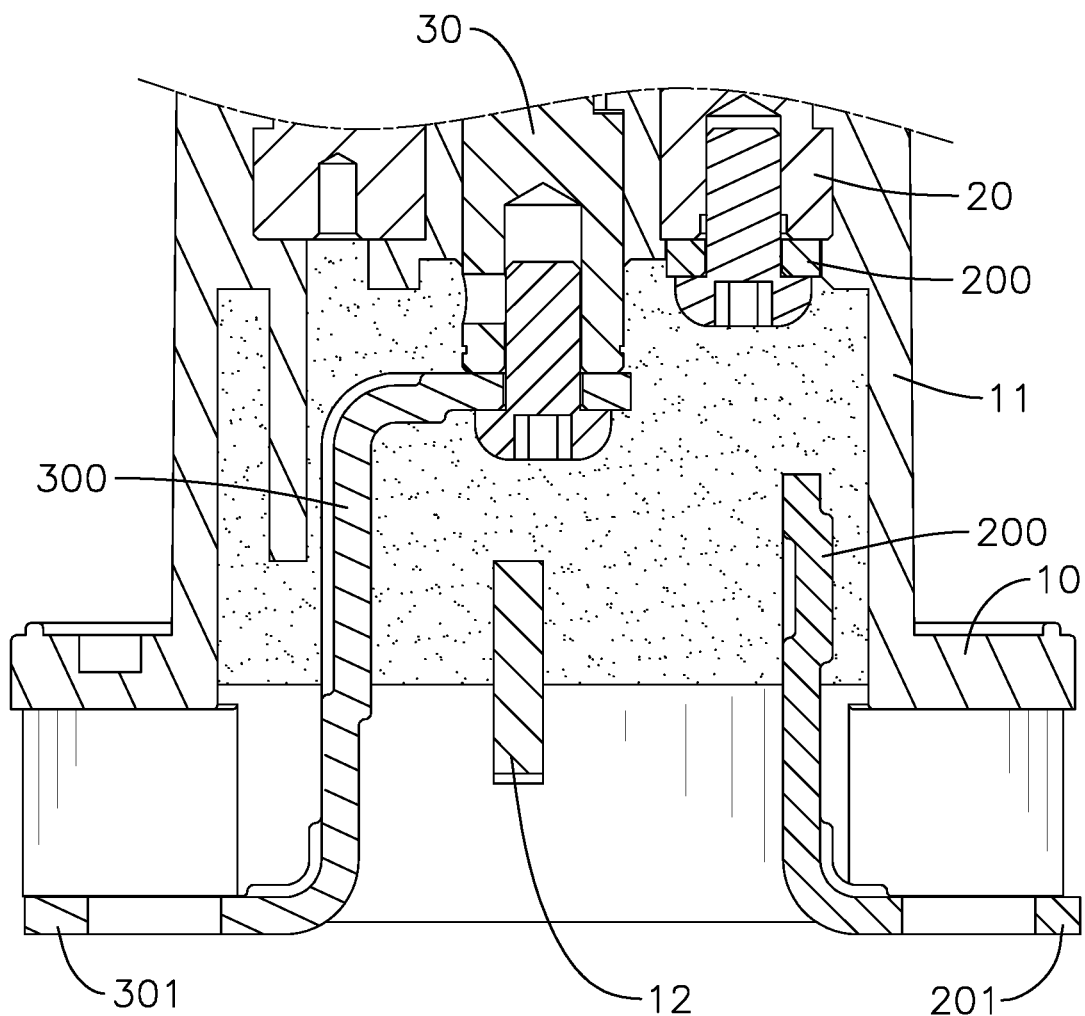
FIG. 5 is another partial enlarged side view in cross-section of the preferred embodiment of the electrical connector for charging in FIG. 1.

With reference to FIG. 5, by the abovementioned configuration of the partition wall 12, the creepage distance along the bottom surface of the connector base 10 between the first conductive piece 200 and the second conductive piece 300 is significantly increased.

The detailed structure of the second conductive terminal 30 will be elaborated below. With reference to FIG. 3, the second conductive terminal 30 is a narrow elongated hollow cylinder and has an upper channel 31 and a lower channel 32 formed inside and communicating with each other. A diameter of the upper channel 31 is larger than a diameter of the lower channel 32. The lower channel 32 is a screw hole. An elastic contacting unit 33 and a contacting spring 34 are mounted in the upper channel 31 of the second conductive terminal 30. The contacting spring 34 is located in a bottom end of the upper channel 31. The elastic contacting unit is a crown spring, is located in a top end of the upper channel 31, and is located above the contacting spring 34.

Figure 6:
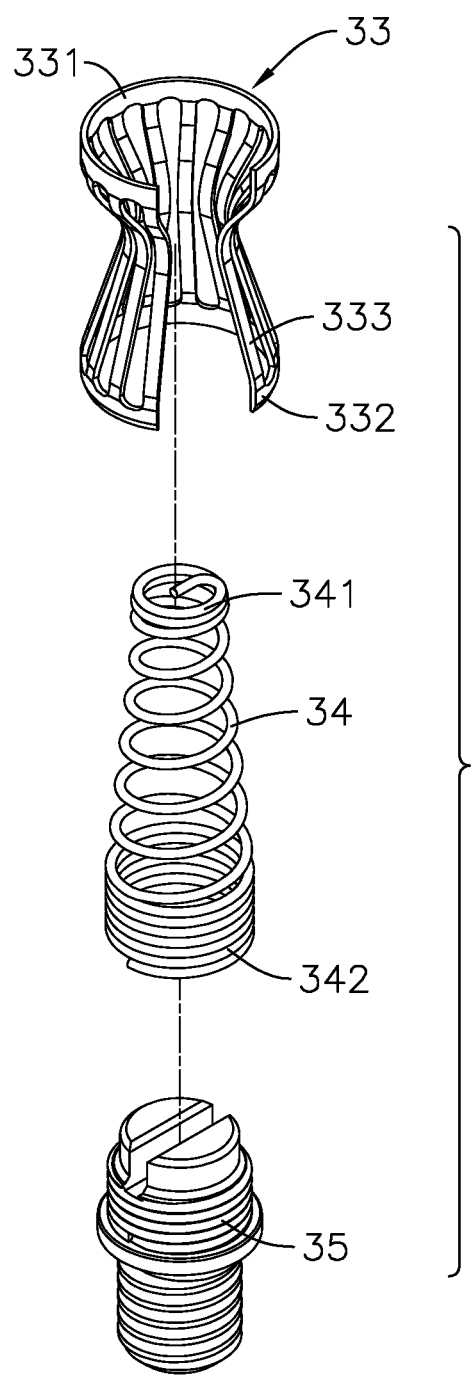
FIG. 6 is an exploded view of the preferred embodiment of the electrical connector for charging in FIG. 1, showing the elastic contacting unit, the contacting spring, and the screw rod.
Figure 6A:
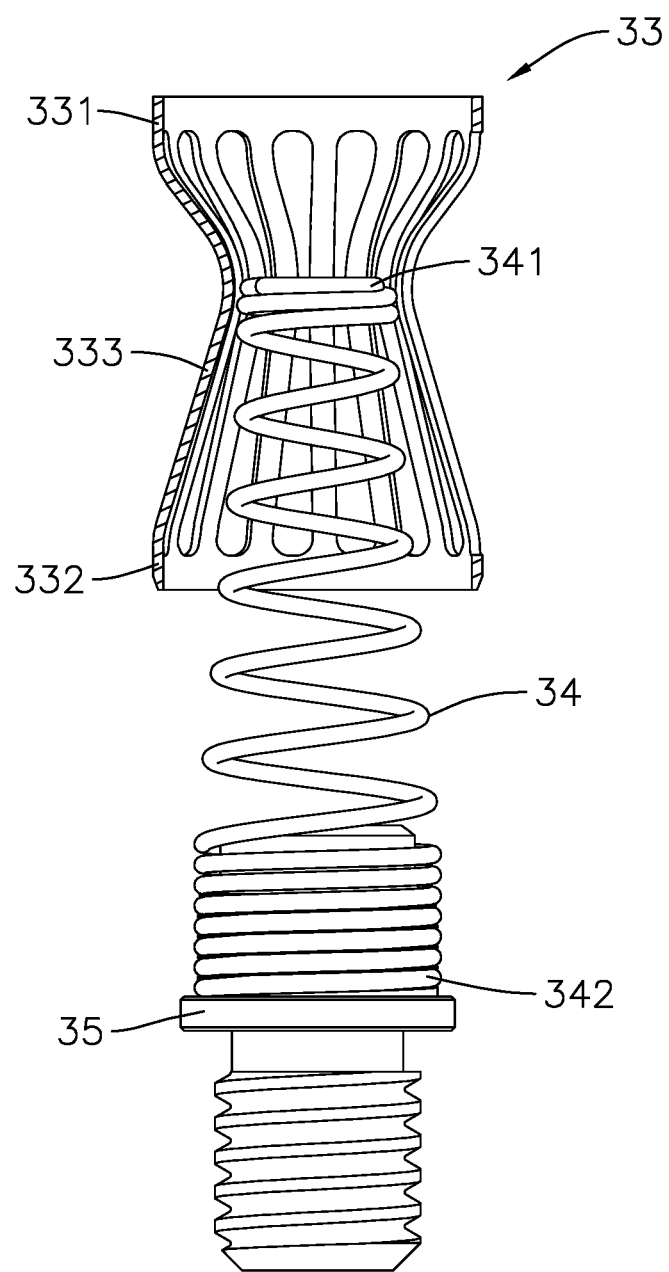
FIG. 6A is a side view in cross-section of the preferred embodiment of the electrical connector for charging in FIG. 1, showing the elastic contacting unit, the contacting spring, and the screw rod.
Figure 7:
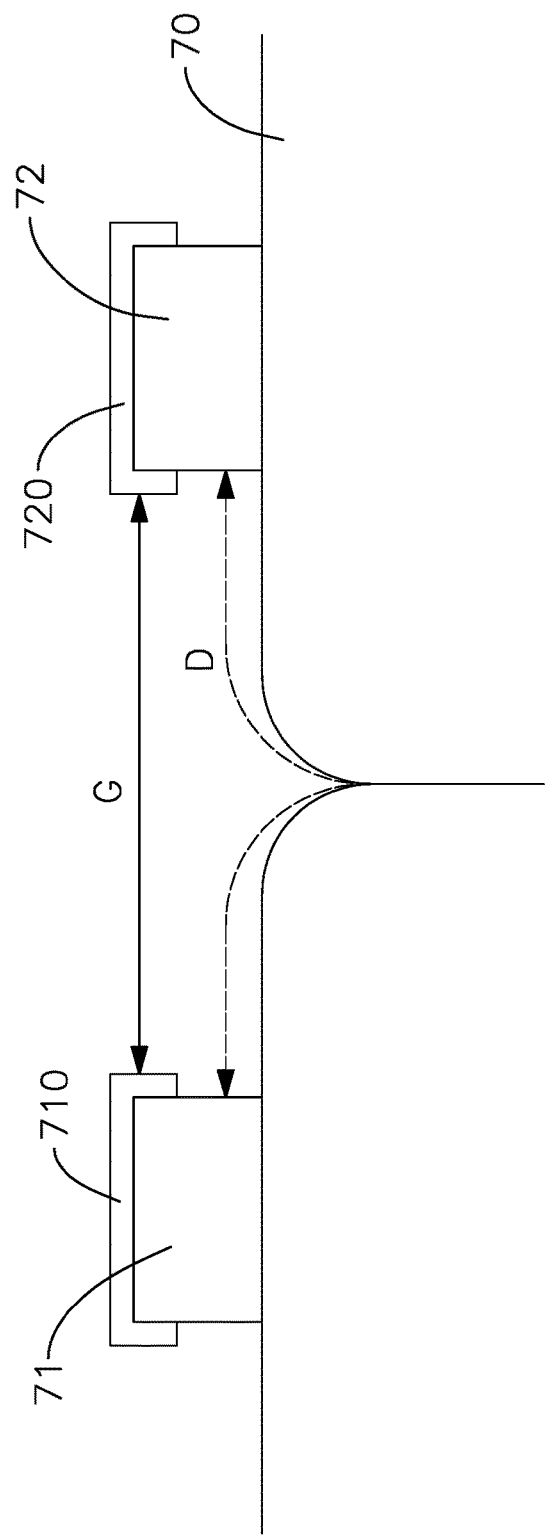
FIG. 7 is a schematic diagram of creepage distance.
Figure 8:
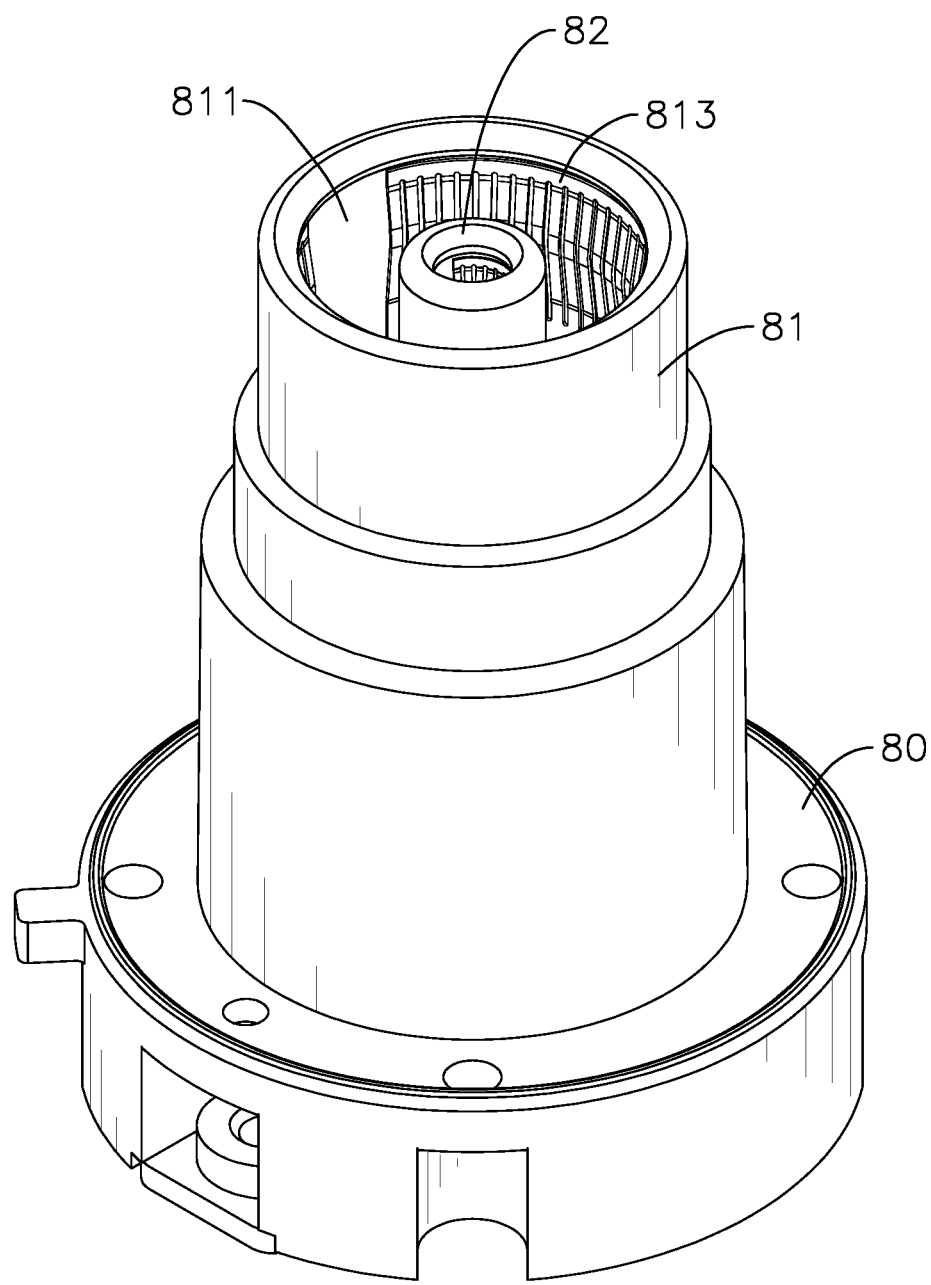
FIG. 8 is a perspective view of a conventional electrical connector for charging.
Figure 9:
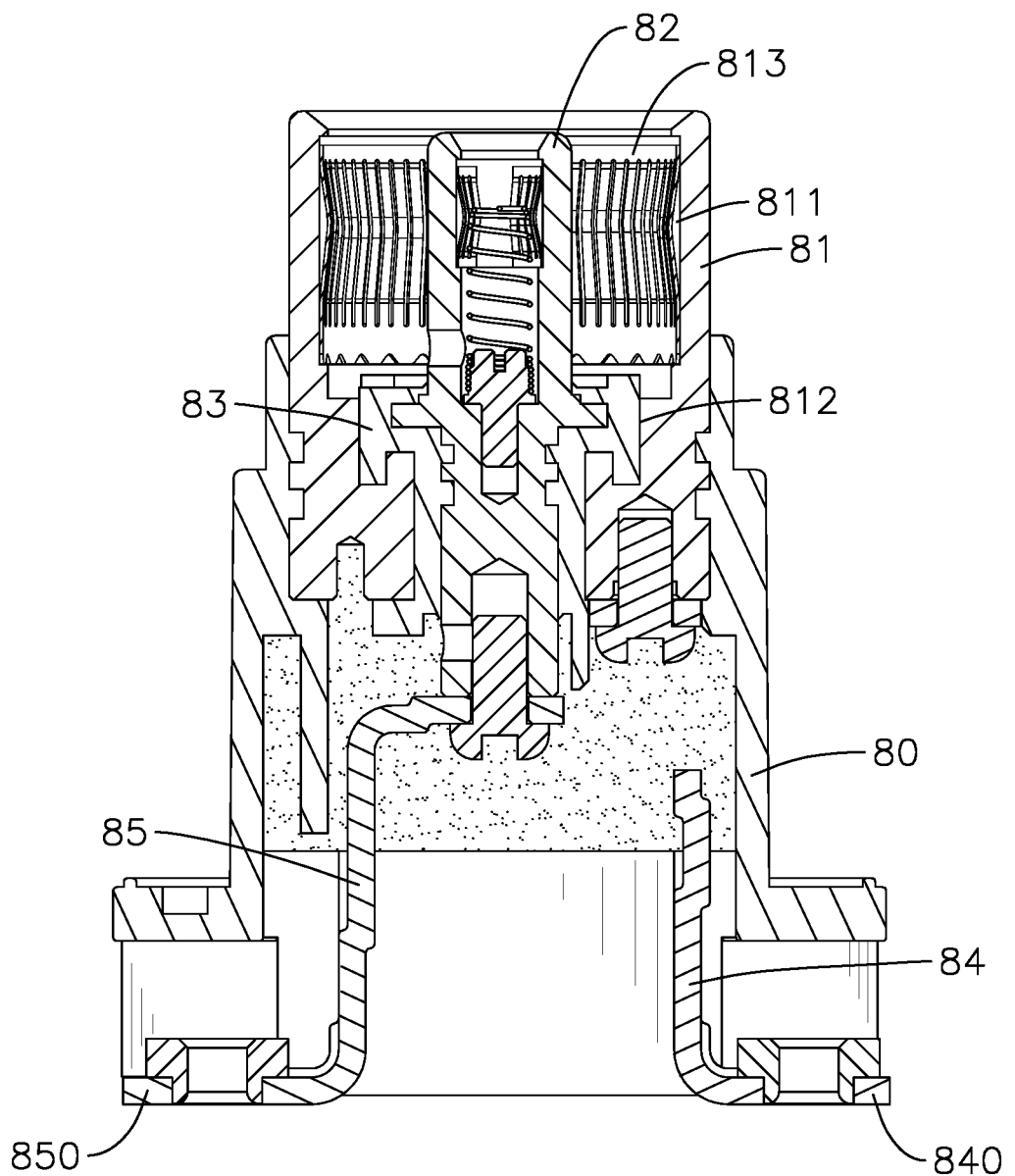
FIG. 9 is a side view in cross-section of the conventional electrical connector for charging.
Figure 10:
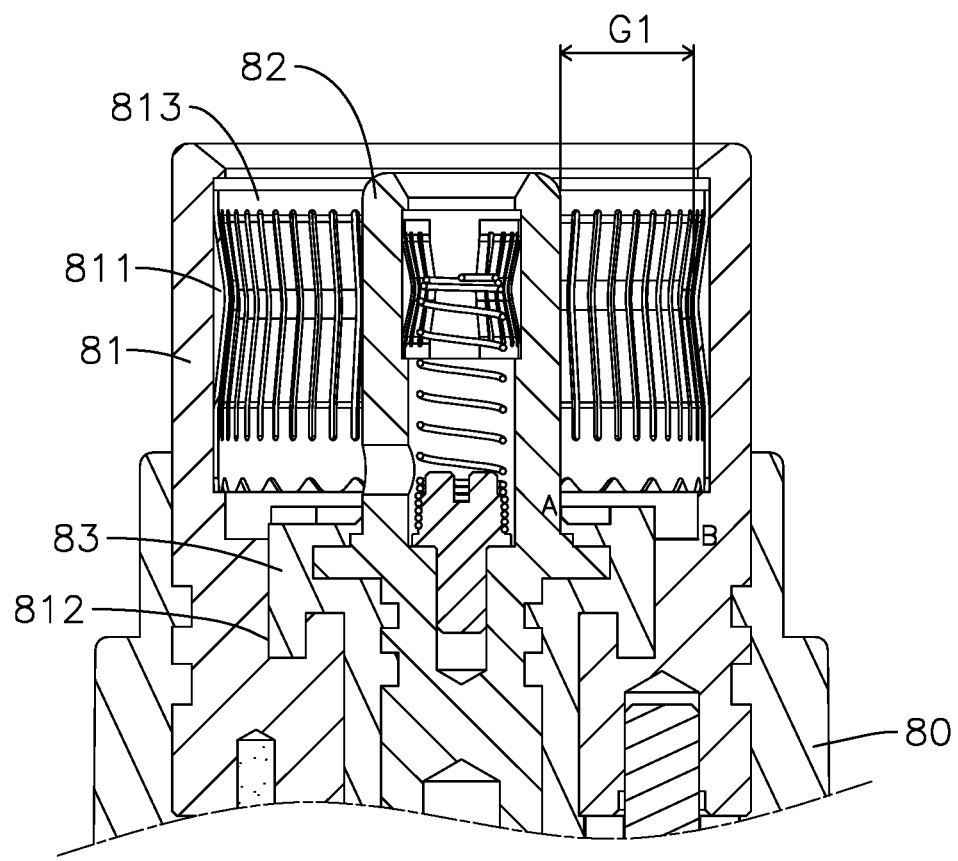
FIG. 10 is a partial enlarged side view in cross-section of the conventional electrical connector for charging.
Figure 11:
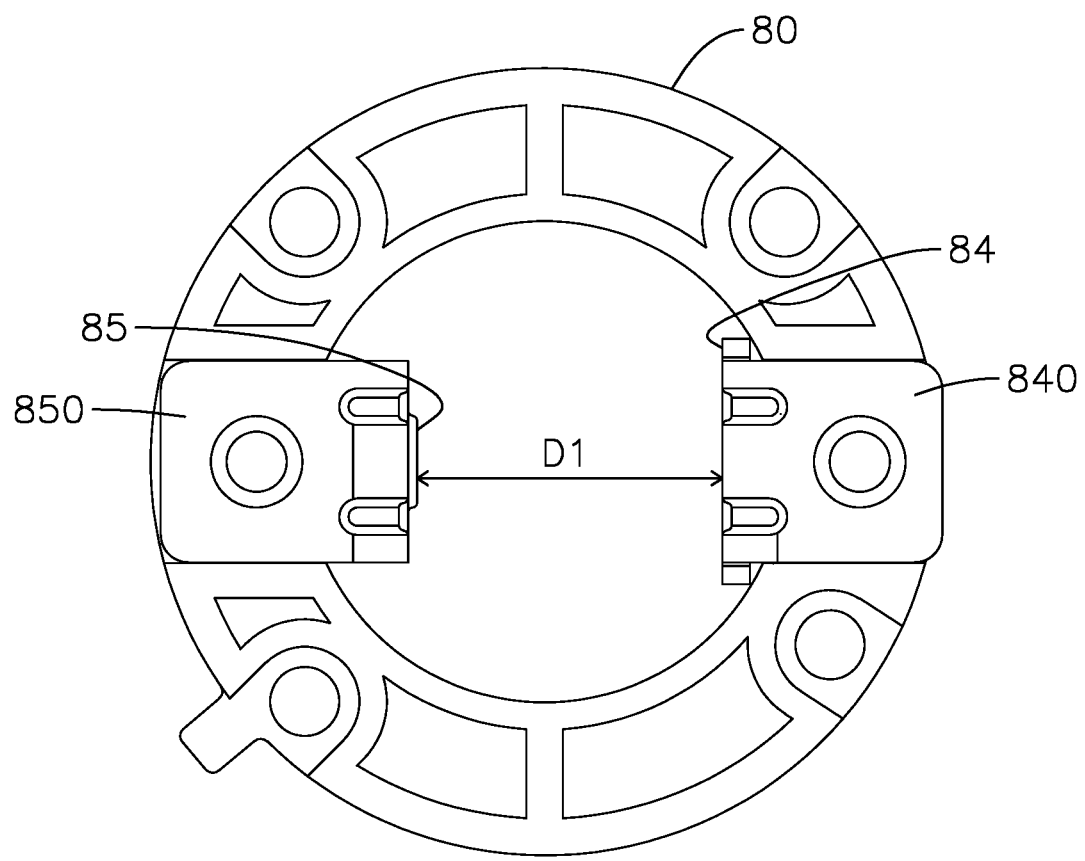
FIG. 11 is a bottom view of the conventional electrical connector for charging.

With reference to FIGS. 6 and 6A, the elastic contacting unit 33 has an upper ring 331, a lower ring 332, and multiple contacting elastic pieces 333. Two ends of each of the contacting elastic pieces 333 are respectively connected to the upper ring 331 and the lower ring 332. Each of the contacting elastic pieces 333 extends along an axial direction of the upper ring 331 and the lower ring 332 and has a contact point. In this embodiment, a distance between the contact point and the lower ring 332 is larger than a distance between the contact point and the upper ring 331. Compared to a conventional crown spring, the elastic contacting unit 33 lengthens the contacting elastic piece 333 (force arm) to extend the service life of the elastic contacting unit 33.

The contacting spring 34 has a convergent segment 341 and a high coil-density segment 342. The convergent segment 34 is formed on a top end of the contacting spring 34 and located below the contact point of the elastic contacting unit 33. An outer diameter of the convergent segment 341 is smaller than an inner diameter of the lower ring 332 of the elastic contacting unit 33 and is larger than an inner diameter of the contacting elastic pieces 333 located on the contact points of the contacting elastic pieces of the elastic contacting unit 33. The high coil-density segment 342 is formed on a lower end of the contacting spring 34 and has dense coils. With reference to FIG. 3, a screw rod 35 is mounted in a lower end of the high coil-density segment 342 of the contacting spring 34 and is screwed with the lower channel 32 of the second conductive terminal 30 to fix the contacting spring 34 on the upper channel 31 of the second conductive terminal 30.

In summary, the present invention has an insulation base mounted between the first conductive terminal and the second conductive terminal. The insulation base has an undulating structure formed on the imaginary datum plane. The undulating structure has at least one first groove lower than the imaginary datum plane and at least one platform higher than the imaginary datum plane so the insolation surface along the surface of the insulation base between the first conductive terminal and the second conductive terminal is significantly extended, thereby increasing the creepage distance along the surface of the insulation base between the first conductive terminal and the second conductive terminal and also expand the heat dissipation area, thereby meeting the safety requirements. Furthermore, the first conductive terminal and the second conductive terminal are respectively connected to the first and the second electrically connecting pieces that protrude out of the bottom of the connector base, and the partition wall is mounted on and protrudes from the bottom surface of the connector base, so the creepage distance along the bottom surface of the connector base between the first electrically connecting piece and the second electrically connecting piece is extended by the partition wall, thereby making the creepage distance between the first electrically connecting piece and the second electrically connecting piece meet the safety requirements.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. An electrical connector for charging, comprising:
   a connector base;
   a first conductive terminal mounted in the connector base; an end of the first conductive terminal mounted in the connector base and another end of the first conductive terminal protruding out of the connector base; the first conductive terminal being a hollow cylinder and having an upper chamber; and
   a lower chamber;
   a second conductive terminal mounted in the connector base, located in the first conductive terminal, being coaxial with the first conductive terminal, and electrically isolated from the first conductive terminal; and
   an insulation base mounted between the first conductive terminal and the second conductive terminal, mounted in the lower chamber of the first conductive terminal, and being shape-complementary with the lower chamber; the second conductive terminal mounted at a center of the insulation base; an end of the second conductive terminal located in the upper chamber of the first conductive terminal and another end of the second conductive terminal protruding out of a bottom of the insulation base; the insulation base having
      an imaginary datum plane; and
      an undulating structure formed on the imaginary datum plane and having
         at least one first groove being lower than the imaginary datum plane and ring-shaped; and
         at least one platform being higher than the imaginary datum plane, ring-shaped, and coaxial with the at least one first groove.

2. The electrical connector for charging as claimed in claim 1, wherein the first groove of the undulating structure is located on an outer side of the platform of the undulating structure.

3. The electrical connector for charging as claimed in claim 1, wherein a depth of the first groove of the undulating structure is larger than a half of a thickness of the insulation base.

4. The electrical connector for charging as claimed in claim 2, wherein a depth of the first groove of the undulating structure is larger than a half of a thickness of the insulation base.

5. The electrical connector for charging as claimed in claim 1, wherein the platform of the undulating structure protrudes from the imaginary datum plane and is higher than a bottom of the upper chamber of the first conductive terminal.

6. The electrical connector for charging as claimed in claim 4, wherein the platform of the undulating structure protrudes from the imaginary datum plane and is higher than a bottom of the upper chamber of the first conductive terminal.

7. The electrical connector for charging as claimed in claim 1, wherein
   an outer diameter of the platform of the undulating structure is equal to an inner diameter of the first groove; and
   an outer annular wall of the platform is formed by an inner side wall of the first groove extending upward.

8. The electrical connector for charging as claimed in claim 6, wherein
   an outer diameter of the platform of the undulating structure is equal to an inner diameter of the first groove; and
   an outer annular wall of the platform is formed by an inner side wall of the first groove extending upward.

9. The electrical connector for charging as claimed in claim 2, wherein the undulating structure has
a second groove located on an inner side of the platform.

10. The electrical connector for charging as claimed in claim 8, wherein the undulating structure has
a second groove located on an inner side of the platform.

11. The electrical connector for charging as claimed in claim 1, wherein the second conductive terminal is a hollow cylinder and has
an upper channel formed in the second conductive terminal;
a lower channel formed in the second conductive terminal and communicating with the upper channel; a diameter of the upper channel being larger than a diameter of the lower channel;
a contacting spring mounted in the upper channel and located in a bottom end of the upper channel; and
an elastic contacting unit mounted in the upper channel, located in a top end of the upper channel, and located above the contacting spring; the elastic contacting unit being a crown spring and having
an upper ring
a lower ring
multiple contacting elastic pieces; two ends of each of the contacting elastic pieces respectively connected to the upper ring and the lower ring; each of the contacting elastic pieces protruding along a radial direction of the upper ring and the lower ring and having
a contact point; a distance between the contact point and the lower ring being larger than a distance between the contact point and the upper ring.

12. The electrical connector for charging as claimed in claim 10, wherein the second conductive terminal is a hollow cylinder and has
an upper channel formed in the second conductive terminal;
a lower channel formed in the second conductive terminal and communicating with the upper channel; a diameter of the upper channel being larger than a diameter of the lower channel;
a contacting spring mounted in the upper channel and located in a bottom end of the upper channel; and
an elastic contacting unit mounted in the upper channel, located in a top end of the upper channel, and located above the contacting spring; the elastic contacting unit being a crown spring and having
an upper ring
a lower ring
multiple contacting elastic pieces; two ends of each of the contacting elastic pieces respectively connected to the upper ring and the lower ring; each of the contacting elastic pieces protruding along a radial direction of the upper ring and the lower ring and having
a contact point; a distance between the contact point and the lower ring being larger than a distance between the contact point and the upper ring.

13. The electrical connector for charging as claimed in claim 11, wherein
the contacting spring has
a convergent segment formed on a top end of the contacting spring and located below the contact point of the elastic contacting unit; an outer diameter of the convergent segment being smaller than an inner diameter of the lower ring of the elastic contacting unit and being larger than an inner diameter of the contacting elastic pieces located on the contact points of the contacting elastic pieces of the elastic contacting unit; and
a high coil-density segment formed on a lower end of the contacting spring and having dense coils;
the lower channel of the second conductive terminal is a screw hole; and
a screw rod is mounted in a lower end of the high coil-density segment of the contacting spring and screwed with the lower channel of the second conductive terminal.

14. The electrical connector for charging as claimed in claim 12, wherein
the contacting spring has
a convergent segment formed on a top end of the contacting spring and located below the contact point of the elastic contacting unit; an outer diameter of the convergent segment being smaller than an inner diameter of the lower ring of the elastic contacting unit and being larger than an inner diameter of the contacting elastic pieces located on the contact points of the contacting elastic pieces of the elastic contacting unit; and
a high coil-density segment formed on a lower end of the contacting spring and having dense coils;
the lower channel of the second conductive terminal is a screw hole; and
a screw rod is mounted in a lower end of the high coil-density segment of the contacting spring and screwed with the lower channel of the second conductive terminal.

15. The electrical connector for charging as claimed in claim 1, wherein
a first conductive piece is mounted on a bottom of the connector base; an end of the first conductive piece is fixed on a bottom of the first conductive terminal and is electrically connected to the first conductive terminal; another end of the first conductive piece extends out of the bottom of the connector base and is turned perpendicularly toward a side of the bottom of the connector base;
a second conductive piece is mounted on the bottom of the connector base; an end of the second conductive piece is fixed on a bottom of the second conductive terminal and is electrically connected to the second conductive terminal; another end of the second conductive piece extends out of the bottom of the connector base and is turned perpendicularly toward a side opposite to the first conductive piece of the bottom of the connector base; and
a partition wall is mounted on the bottom of the connector base, protrudes from a bottom surface of the connector base, and is located between the first conductive piece and the second conductive piece to separate the first conductive piece and the second conductive piece.

16. The electrical connector for charging as claimed in claim 14, wherein
a first conductive piece is mounted on a bottom of the connector base; an end of the first conductive piece is fixed on a bottom of the first conductive terminal and is electrically connected to the first conductive terminal; another end of the first conductive piece extends out of the bottom of the connector base and is turned perpendicularly toward a side of the bottom of the connector base;
a second conductive piece is mounted on the bottom of the connector base; an end of the second conductive piece is fixed on a bottom of the second conductive terminal and is electrically connected to the second conductive terminal; another end of the second conductive piece extends out of the bottom of the connector base and is turned perpendicularly toward a side opposite to the first conductive piece of the bottom of the connector base; and a partition wall is mounted on the bottom of the connector base, protrudes from a bottom surface of the connector base, and is located between the first conductive piece and the second conductive piece to separate the first conductive piece and the second conductive piece.

17. The electrical connector for charging as claimed in claim 15, wherein a width of the partition wall is larger than a width of the first conductive piece and a width of the second conductive piece.

18. The electrical connector for charging as claimed in claim 16, wherein a width of the partition wall is larger than a width of the first conductive piece and a width of the second conductive piece.

* * * * *